United States Patent [19]

Nakamura

[11] Patent Number: 5,280,566

[45] Date of Patent: Jan. 18, 1994

[54] FUZZY INFERENCE DEVICE

[75] Inventor: Kazuo Nakamura, Itami, Japan

[73] Assignee: Mitsubishi Denki Kabushiki Kaisha, Tokyo, Japan

[21] Appl. No.: 669,131

[22] Filed: Mar. 13, 1991

[30] Foreign Application Priority Data

Mar. 15, 1990 [JP] Japan .................................. 2-64853

[51] Int. Cl.⁵ .............................................. G06F 9/44
[52] U.S. Cl. ........................................ 395/51; 395/61; 395/900
[58] Field of Search .................... 395/3, 61, 900, 51

[56] References Cited

FOREIGN PATENT DOCUMENTS 61-264411  5/1985  Japan .

OTHER PUBLICATIONS

"A VLSI Implementation of a Fuzz-Inference Engine: Toward an Expert Systme on a Chip", Togai and Watanabe, Information Sciences 38, 147–163, 1986.

"A Fuzzy Logic Chip and a Fuzzy Inference Accelerator for Real-Time Approximate Reasoning", Masaki Togai, Rockwell International Science Center, date unknown.

Primary Examiner—Allen R. MacDonald
Attorney, Agent, or Firm—Lowe, Price, LeBlanc & Becker

[57] ABSTRACT

A fuzzy inference method which improves reliability of an inference result by obtaining a variance which is a statistical value. The variance considers not only the value of a membership function derived from performing maximum operation (logical AND) but also a position of the function. These values are added and, according to this result, any inconsistency in fuzzy rules is detected.

4 Claims, 11 Drawing Sheets

FUZZY INFERENCE DEVICE

BACKGROUND OF THE INVENTION

1. Field of the Invention

The present invention relates to a fuzzy inference method. Particularly, it relates to a fuzzy inference method which enables a user to check for inconsistency among the fuzzy rules defined in a fuzzy inference.

2. Description of the Related Art

Below is described a prior art fuzzy inference method.

Fuzzy inference comprises executing a fuzzy operation in accordance with a fuzzy rule which was defined in advance for one or more inputs (inference rule, hereinafter referred to as rule) and then to output an operation result as an inference result.

Assuming that inputs are designated by x0, x1, x2 ... and outputs are designated by y1, y2 ..., the rule is represented in the following format

---

"IF x0 = A and x1 = B and x2 = A ...
"Then y1 = P, y2 = Q ...
Where the former part of the rule
"IF x0 = A and x1 = B and x2 = A ..."
is called an antecedent, and the latter part
"Then y1 = P, y2 = Q ..."
is called a consequent. This rule means that if x0 is the value of A, x1 is the value of B, x2 is the value of A, and so forth at the same time, the value of P as y1, the value of Q as y2, and so forth are outputted.

---

The values of A, B, P, Q, and so on are called fuzzy variables of the rule. These fuzzy variables are defined not as a single value but as a triangular or bell shape function designating a grade as shown in a graph of FIG. 1.

In FIG. 1, the horizontal axis designates the input value or output value, and the vertical axis designates the grade. Two fuzzy variables of A and B for the variable x1 are shown in FIG. 1. In the case where the value of variable x1 is x11, for example, the grades for the fuzzy variables A and B are designated by sb1 and sb1, respectively. In the case where the value of the variable x1 is x12, the grades for the fuzzy variables A and B are designated by 0 and sb2, respectively. The fuzzy logic, the description "x1=A" is evaluated not by two values showing the fact that the description is true or false but by successive values called grades. The function defining such grades is called a membership function.

It is not necessary to limit the number of equations

"x1=A", "x2=B", "x3=A"

in the antecedent and

"y1=P" "y1=Q"

in the consequent to the specific example given above. Hereinafter, an example according to the present invention includes two descriptions in the antecedent and one description in the consequent of the rule.

There are several well-known methods of the fuzzy inference, one of which called the min-max-centroid method. In the methods of making a fuzzy inference using the min-max-centroid method, an operation in accordance with the above described rule is employed.

For example, as shown in FIG. 2, an inference in accordance with the following two rules is made as follows.

IF x1=A and x2=B Then y=P (Rule 1)

IF x1=C and x2=D Then y=Q (Rule 2)

First, for the description of "x1=A" in the antecedent of the rule 1, in accordance with a membership function defining A, the grade s11 defines how much of input x1 results. In the same way, for the description of "x2=B", grade s12 designates how much the input x2 is adapted to B. And, in accordance with the "and" operation, the grade of the smaller value of grades s11 and s12 is selected and the result designated s1. The grade s1 becomes the adaptation for the rule 1.

As in the same way, for the rule 2, for the description of "x1=c", the grade s21 of the input x1 for C is obtained, and for the description of "x2=D", the grade s22 of the input x2 for D is obtained, respectively, out of which the grade of a smaller value is selected by the minimum operation and is designated s2.

Processing to obtain the consequent of the rule is performed as follows.

In the consequent, function H1 can be visualized as the part left by excluding a portion greater than the grade s1 to obtain membership function G1 defining the fuzzy variable P in accordance with the description of "y1=P" of the rule 1. In a similar manner, function H2 can be defined as a portion remaining after excluding portions greater than grade s2 to obtain the membership function G2 defining the fuzzy variable Q.

A resultant function F is created by selecting the greater value of function H1 or function H2 at each value of y, resulting in F, an output membership function (this process is called maximum operation).

Function F is shown in the lowest right part of FIG. 2, wherein weighting of the grades of the rules 1 and 2 to the meanings of the rules 1 and 2 are depicted. In other words, in accordance with the rule 1, the central value P of the function G1 is specified to be outputted as y. However, the grade s1 of the rule 1 is relatively large as is shown in the figure. Then the resultant function H1 has a relatively minor truncation of peak values. On the other hand, in accordance with the rule 2, the central value q of the function G2 is specified to be outputted as y, and the grade s2 of the rule 2 is relatively small as is shown in the figure. Then function H2 has a highly truncated or flattened upper portion.

Accordingly, it is readily seen that the average value of the functions H1 and H2 may be employed as the final output value of y. In this case, however, the arithmetic average value of the functions H1 and H2 is not calculated by the min-max-centroid method, and the maximum operation is executed for the functions H1 and H2 to obtain the function F, and the center of gravity of the function F is made to be the average of the meanings of the both functions H1 and H2. In other words, such a center of gravity r of the function F as shown in FIG. 2 is an inference result which is equal to the output value of y.

The fuzzy inference in accordance with the min-max-centroid method is as described above. However, there is a need to evaluate validity of the inference result, that is, inconsistency in the defined rule. For example, there may be several cases of a combination of functions with the same central value r, such as the functions F1 and F2 shown in FIG. 3, and it is necessary to evaluate the shape of these functions.

Now will be referred to such two functions F1 and F2 as shown in FIG. 3.

First, for the function F1, there is a large distance between the two functions H11 and H12 which are objects of the maximum operation, and the both functions have relatively large maximum values. This means that a rule 11 and a rule 12 which lead the functions H11 and H12, respectively have inconsistent meanings with each other. In other words, in the case where input is in such a state as shown in FIG. 3, p1 is specified to be outputted as the y in accordance only with the rule 11 and q1, is specified to be outputted only in accordance with the rule 12. In this case, needless to say, it is possible to obtain the center of gravity r of the function F1 as the inference result. However, r falls between the two rules; it is insufficient in such a case to merely calculate the intermediate value of the requests of the two inconsistent rules since the reliability of this value is extremely low.

On the other hand, referring to function F2, there is a relatively small distance between the two functions H21 and H22 which are objects of the maximum operation. However, function H21 has substantially a smaller maximum value in comparison with the function H22. In this case, a rule 21 and a rule 22 which lead both the functions H21 and H22, respectively, specify outputs p2 and q2, respectively. Input conditions being adapted to those rules are different, then, it does not necessarily mean that those rules are inconsistent. This is because the input state as shown in FIG. 3 is completely adapted to the antecedent of the rule 22 but is only loosely adapted to the antecedent of the rule 21, e.g., only slightly affected. Accordingly, an instruction of the rule 22 greatly reflects upon its output and an instruction of the rule 21 hardly reflects upon its output. In other words, it means that there is no problem in the case where the two rules specify to output different values, respectively.

As may be seen from the above description, there exists the case where meanings of the two rules are inconsistent in the fuzzy inference, then, it is necessary not only to make the combined reference but also to detect inconsistency in the rules defining the inference.

As an example of the fuzzy inference apparatus for detecting such inconsistency in the rules, there is known one in Japanese Patent Application Laid-Open No. 61-264411 (1986). Now will be described in brief below the method of detecting inconsistency in fuzzy rule which is disclosed in above-mentioned Japanese Patent Application Laid-Open No. 61-264411 (1986) with reference to FIG. 4 of its schematic illustration.

According to the method disclosed in the Japanese Patent Application Laid-Open No. 61-264411 (1986), in the case where the finally obtained membership function has two or more larger peaks, it is decided that the rules are inconsistent. According to the method wherein, the largest peak value of the membership function is $g_{M1}$, the second largest peak value is $g_{M2}$, and the minimum value of the membership function between these peaks is $l_1$ as shown in FIG. 4, then if $$g_{M1} = g_{M2}, \text{ or}$$
$$g_{M1} \neq g_{M2} \text{ and}$$
$$(g_{M2} - l_1)/(g_{M1} - g_{M2}) \geq r_g,$$

(normally, constant $r_g = 1$), it is concluded that there are two or more large peaks.

In other words, the above two equations are the index to show how large the second peak is compared with the first peak, accordingly, it is decided whether or not there are two or more peaks by evaluating these equations.

However, such a method of detecting inconsistency in rules as disclosed in the above-mentioned Japanese Patent Application Laid-Open No. 61-264411 evaluates only the relationship of magnitude between the peaks of the membership function. This means that the method evaluates the vertical axis of the membership function alone but it takes no horizontal axis into its consideration. Then, in the case where there are two membership functions which have peaks of the same heights and different distances as shown in FIG. 5(a) and FIG. 5(b), for example, it is not possible to distinguish the case, shown in FIG. 5(a) from the case shown in FIG. 5(b). In other words, the functions which are shown in FIG. 5(a) and FIG. 5(b) have the same values in $g_{M1}$, $g_{M2}$ and $l_1$ as well as the equation $$(g_{M2} - l_1)/(g_{M1} - g_{M2}) \leq 1$$

is established in the both functions.

As a result, according to the method disclosed in the abovementioned Japanese Patent Application Laid-Open No. 61-264411, it is decided that there is no inconsistency in the rules. However, it should be decided that there is relatively little inconsistency in the case shown in FIG. 5(a) but there is a large inconsistency in the case shown in FIG. 5(b) because it is apparently seen that the two rules specify to output largely different values.

As mentioned above, in such a method of detecting inconsistency in rules as disclosed in the Japanese Patent Application Laid-Open No. 61-264411, there is a problem that even in the case where it is valid to decide that there is inconsistency in the rules, it is not possible to detect it. In other words, it can be said that precision in detecting inconsistency in the rules is low.

SUMMARY OF THE INVENTION

The foregoing problem is solved in accordance with the present invention, and the primary object of the invention is to provide a fuzzy inference method capable of detecting inconsistency in a rule with great precision.

The fuzzy inference method in accordance with the present invention improves reliability of an inference result by calculating a variance which is the statistical value obtained by adding not only a function value (value of the vertical axis) of a membership function derived after the maximum operation but also a position of the function (value of the horizontal axis) and finding an inconsistency in the rule in accordance with this calculation result.

The above and further objects and features of the invention will more fully be apparent from the following detailed description with accompanying drawings.

DESCRIPTION OF THE PREFERRED EMBODIMENTS

Figure 6:
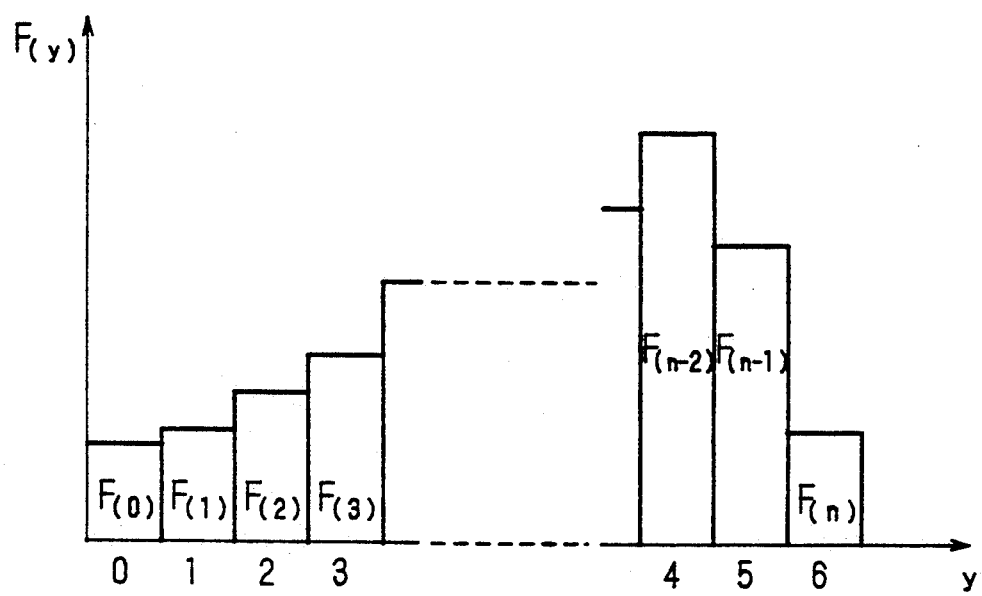
FIG. 6 is a schematic view to illustrate a function defined in a digital operation.

A preferred embodiment of the present invention is herein detailed with reference to the accompanying drawings. However, prior to the description of the preferred embodiments of the present invention, a method of calculating the center of gravity and variance in the fuzzy operation by a digital operation is described. In the digital operation, as shown in FIG. 6, a function $F_{(y)}$ is defined with integer values $F_{(0)}$, $F_{(1)}$, $F_{(2)}$, $F_{(3)}$, ... $F_{(n-1)}$, $F_{(n)}$ in discrete values y (y=0, 1, 2 ... n).

Calculation of the center of gravity of such a function is defined with the value "P/Q", which is obtained by dividing the following equation P by the equation Q:

$$P = F_{(0)}X0 + F_{(1)}X1 + F_{(2)}X2 + \ldots + F_{(n-1)}X(n-1) + F_{(n)}Xn$$
$$Q = F_{(0)} + F_{(1)} + F_{(2)} + \ldots + F_{(n-1)} + F_{(n)}.$$

However, the equation P may be designated by the following equation:

$$P = (F_{(n)}) + (F_{(n)} + F_{(n-1)}) + \ldots +$$
$$(F_{(n)} + F_{(n-1)} + \ldots F_{(2)} + F_{(1)}),$$

and then, assuming that $$Q_j = F_{(n)} + F_{(n-1)} + F_{(n-2)} + \ldots + F_{(j+1)} + F_{(j)},$$

the equation P is designated as follows:

$$P = Q_n + Q_{n-1} + Q_{n-2} + \ldots + Q_2 + Q_1.$$

Since Qj designates the intermediate result in obtaining Q, P and Q can be obtained by the following steps.

(1) Set that j=n, $Q_j=0$, and $O_j=0$.
(2) Add $Q_j$ to $P_j$, and add $F_{(j)}$ to $Q_{(j)}$, respectively.
(3) Subtract 1 from j.
(4) Repeat the processings of steps (2) and (3) until j becomes not more than 0.

(5) It is obtained that $Q=Q_j$, and $O=P_j$.

In a similar manner, a variance U whose center is the center of gravity r of the function $F_{(y)}$ is generally defined by the following equation:

$$U = F_{(0)}X(r-0)^2 + F_{(1)}X(r-1)^2 + \ldots +$$
$$F_{(r-1)}X(r-r+1)^2 + F_{(r+1)}X(r+1-r)^2 + \ldots +$$
$$F_{(n-1)}X(n-1-r)^2 + F_{(n)}X(n-r)^2.$$

Here, in thinking the variance U, dividing the function F into two parts, one of which is a part that y is smaller than center of gravity r and the other of which is a part that y is larger than center of gravity r, and it is assumed that both the parts are designated as follows:

$$Y_j = F_{(0)}X(r-0) + F_{(1)}X(r-1) + \ldots +$$
$$F_{(j-1)}X(r-j+1) + F_{(j)}X(r-j)$$

$$W_j = F_{(n)}X(n-r) + F_{(n-1)}X(n-1-r) + \ldots +$$
$$F_{(j+1-r)}X(j+1-r) + F_{(j-r)}X(j-r),$$

and then, the variance U is to be designated as follows:

$$U = V_0 + V_1 + \ldots + V_{r-2} + V_{r-1} + W_n +$$
$$W_{n-1} + \ldots W_{r+2} + W_{r+1}.$$

Accordingly, the variance U can be obtained by the following steps:

(1) Set that j=0, $V_j=0$, and $U_j=0$.
(2) Add $V_j$ to $U_j$, and add $F_{(j)}$ X(r-j) to $V_j$, respectively.
(3) Add 1 to j.
(4) Repeat the processings of steps (2) and (3) until j becomes larger than r.
(5) Set that j=n, and $W_j=0$ (note, value of $U_j$ is unchanged).
(6) Add $W_j$ to $U_j$, and add $F_{(j)}$ X(j-r) to $W_j$ respectively.
(7) Subtract 1 from j.
(8) Repeat the processings of steps (6) and (7) until j becomes smaller than r.
(9) It is obtained that $U=U_j$.

In other words, P can be obtained by repeating additional, and U can be obtained by repeating multiplication and addition, respectively.

Now will be described below preferred embodiments of the present invention in accordance with the above-mentioned method.

Figure 7:
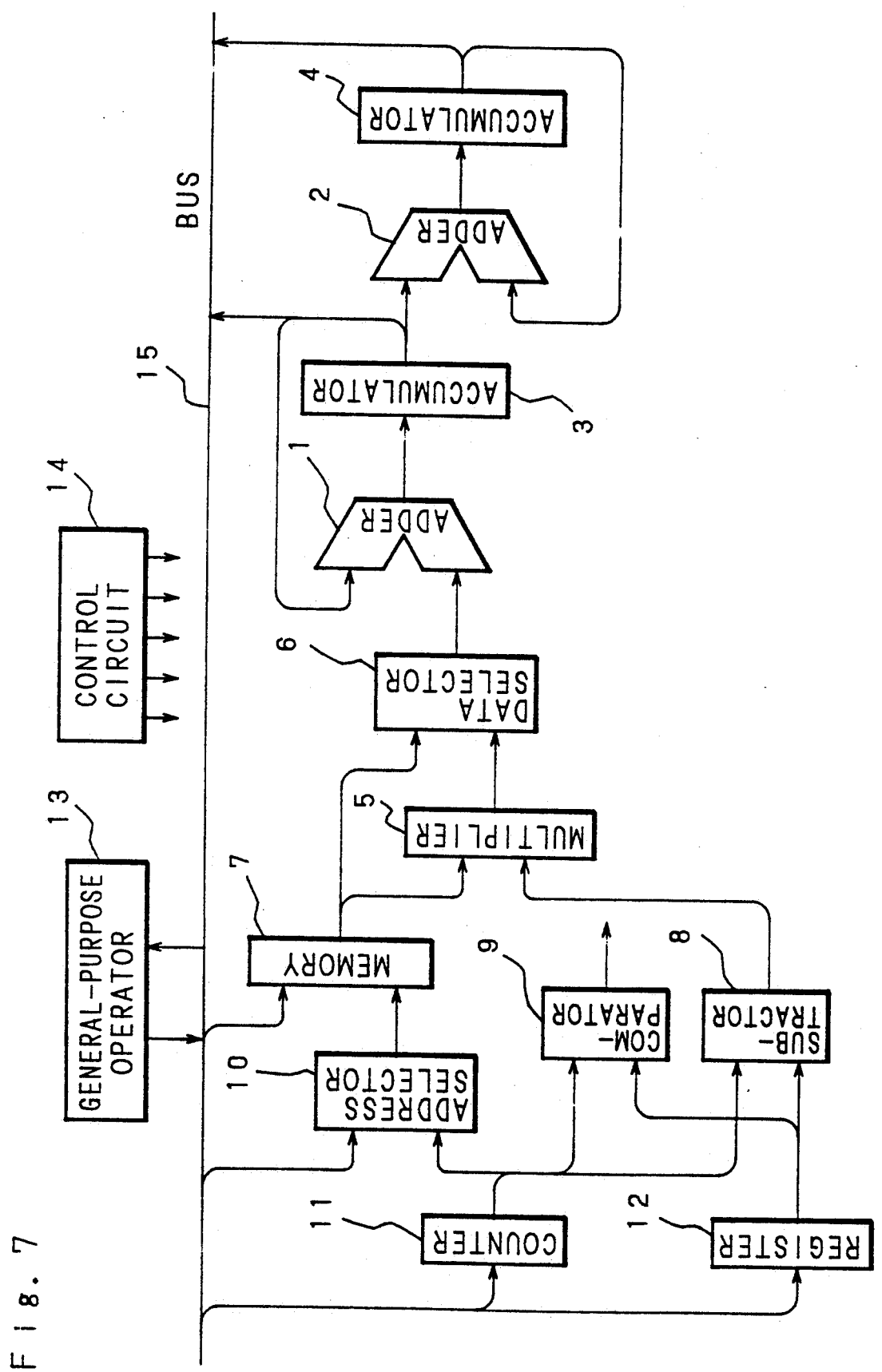
FIG. 7 is a block diagram to illustrate an example of construction of a fuzzy inference apparatus to execute a fuzzy inference method in accordance with the present invention.

FIG. 7 is a block diagram to illustrate one example of construction of the fuzzy inference apparatus to execute the fuzzy inference method of the present invention. Reference numerals in the figure represent the following elements: 1,2 adder; 3,4, accumulator; 5, multiplier; 6, data selector; 7, memory; 8, subtractor; 9, comparator; 10, address selector; 11, counter; 12, register; 13, general-purpose operator; 14, control circuit; and 15, bus.

The control circuit 14 controls the whole fuzzy inference apparatus shown in FIG. 7, whose control signal being omitted in the interest of clarity of explanation.

Figure 8:
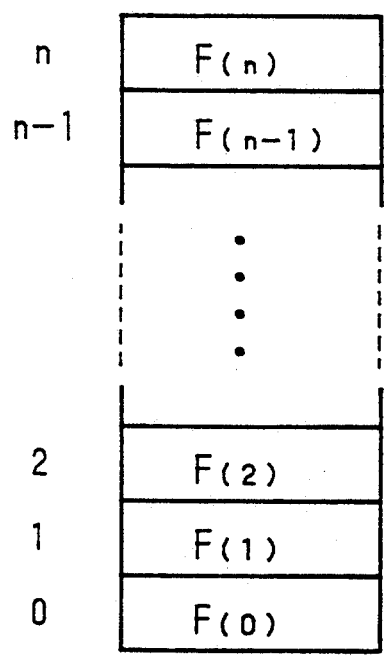
FIG. 8 is a schematic view to illustrate the state that a membership function obtained by the maximum operation is located in a memory in the fuzzy inference apparatus shown in FIG. 7.

The general-purpose operator 13 consists of an operator and a register, and executes the processing for the antecedent and maximum operation. Input and output of the general-purpose operator 13 are connected to the bus 15, and as the membership function F, the final operation result is stored in the memory 7 as shown in FIG. 8. In other words, stored in memory 7 are the function $F_{(0)}$ in the address 0, the function $F_{(1)}$ in the address 1, and so forth, and the function $F_{(n)}$ in the address n, respectively. Because the steps of processing for the antecedent and maximum operation are executed by well-known methods in the present invention, explanation on antecedent and maximum processing is herein omitted.

There are provided adders 1 and 2, accumulators 3 and 4, multiplier 5, data selector 6, subtractor 8, comparator 9, address selector 10, counter 11, and register 12 in order to calculate the center of gravity and variance. The counter 11 counts the value inputted from the bus 15, and outputs its content to the address selector 10, the comparator 9, and the subtractor 8. Register 12 holds the value inputted from the bus 15, and outputs it to the comparator 9 and subtractor 8. Address selector 10 selects either the value inputted from the bus 15 or the value given from the counter 11 and outputs this to the memory 7 as its address. Comparator 9 compares the value supplied by counter 11 with the value from register 12, and outputs this comparison result to control circuit 14.

Each address in the memory 7 is corresponding to each of the data located therein, and the memory 7 fetches the data from the bus 15 and supplies it to multiplier 5 and data selector 6 under control of control circuit 14. In the current example, the address is supplied by address selector 10.

Multiplier 5 multiplies the value given from the memory 7 by the value given from subtractor 8, and outputs this result to the data selector 6. Data selector 6 selects either the value supplied from the memory 7 or the value from multiplier 5, and supplies the selected value to the first input of the adder 1. Adder 1 supplies the sum of supplied values to accumulator 3, and output of this accumulator 3 is the second input of the adder 1. Adder 1 adds two input values and outputs the result to the accumulator 3.

The accumulator 3 accumulates the outputs of the adder 1 and supplies the accumulation result to the bus 15, the second input of the adder 1 and the first input of the adder 2.

The adder 2 supplies a summed output to the accumulator 4, and output of this accumulator 4 is the second input of the adder 2. Adder 2 adds these two inputs together and outputs them to the accumulator 4. Accumulator 4 accumulates the outputs of the adder 2, and outputs its accumulation result to the bus 15 and the second input of the adder 2.

Now are described the calculation process executed by the fuzzy inference apparatus as constructed above, i.e., the steps of the method of the present invention.

Figure 9:
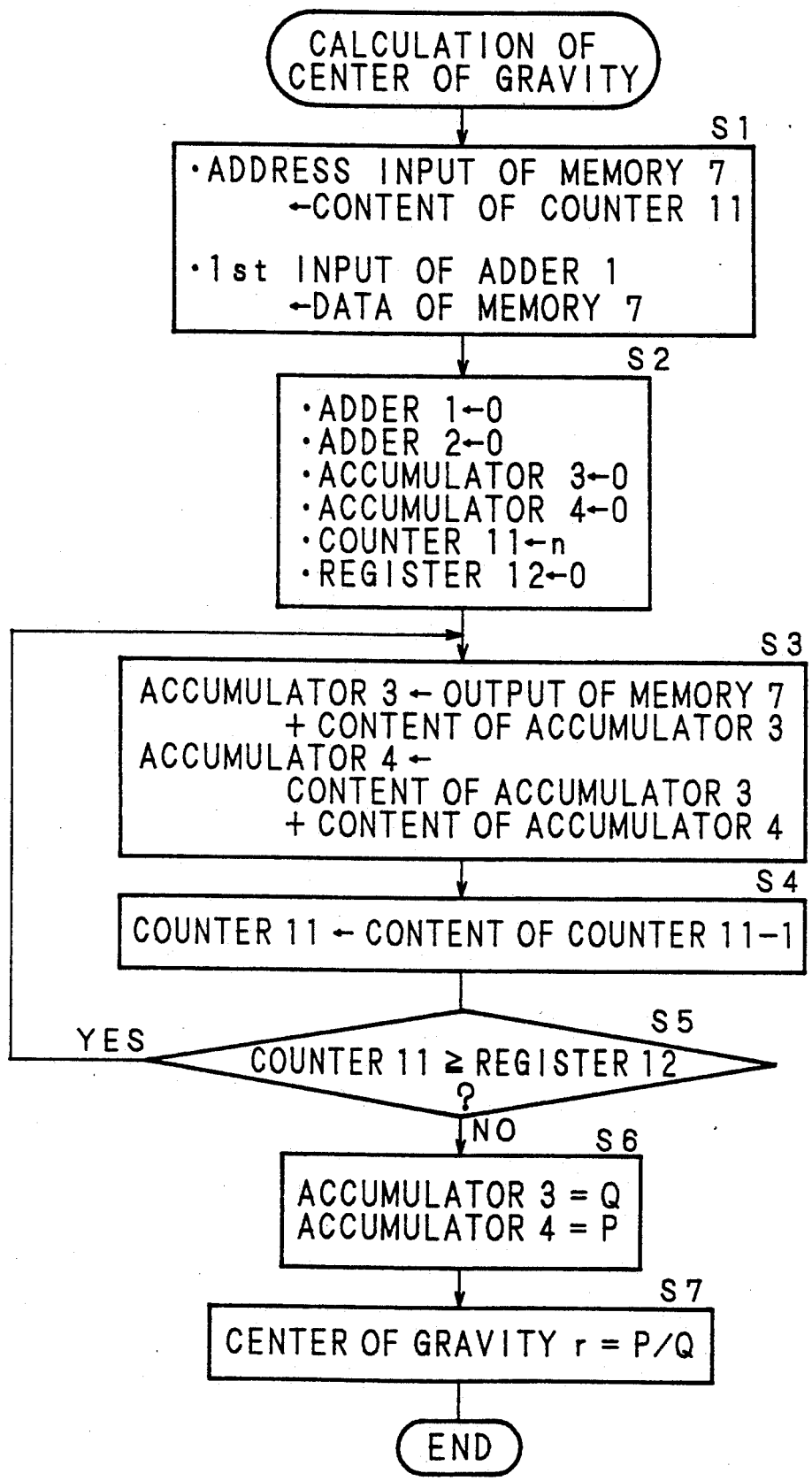
FIG. 9 is a flow chart to illustrate steps of calculating the center of gravity by the method of the present invention.

First, an explanation will be given for calculating of the center of gravity with reference to the flow chart of FIG. 9. In the calculation of the center of gravity, counter 11 holds the value of j, the accumulator 3 holds the value of $Q_j$, and the accumulator 4 holds the value of $P_j$, respectively. Control circuit 14 controls the address selector 10 to select the content of the counter and gives it to the address input of the memory 7. The control circuit 14 also controls the data selector 6 to select the data which is stored in the address of the memory 7 from the address selector 10 to the memory 7 and is given to the adder 1 (Step S1).

Next, the control circuit 14 controls the adder 1 and the adder 2 so as to allow them to each output the value of 0 and initializes the accumulators 3 and 4 to be 0 which are supplied as inputs to adders 1 and 2. Furthermore, the control circuit 14 presets the content of the counter 11 to be a value n via the bus 15 and zeros the content of the register 12 (Step S2).

As a result, the following equations are obtained:

$j = n,$ $Q_j = P_j = 0.$

And, the control circuit 14 controls the adders 1 and 2 to allow the adder 1 to add the content of the accumulator 3 to the output of data selector 6, that is, the output of the memory 7, and to allow the adder 2 to add the content of the accumulator 3 to the content of the accumulator 4, respectively.

$Q_j + F_{(j)},$ and the adder 2 outputs the value:

$P_j + Q_j,$ respectively.

Furthermore, the control circuit 14 controls the accumulator 3 to fetch the output of the adder 1 and controls the accumulator 4 to fetch the output of the adder 2. As a result, the accumulator 3 fetches the sum of the output of the memory 7 and the contents of accumulator 3, and the accumulator 4 fetches the sum of the contents of accumulator 3 and the content of accumulator 4 (Step S3). Control circuit 14 subtracts 1 from the content of the counter 11 (Step S4).

Comparator 9 compares the contents of counter 11 with the contents of register 12, and while the content of the counter 11 is equal or more than the content of the register 12 ($j \leq 0$), control circuit 14 continues to supply data to accumulators 3 and 4 and subtract the content of the counter 11 as mentioned above (Step S5).

In other words, the operations:

$Q_j + F_{(j)},$ $P_{(j)} + Q_j$ are repeated until $j < 0$.

As a result, the value of Q is held in the accumulator 3, and P is held in the accumulator 4, respectively (Step S6). Control circuit 14 transfers both the content of the accumulator 3 and the content of the accumulator 4 to the general-purpose operator 13 and divides P by Q to obtain the center of gravity r of the function F (Step S7).

Figure 10:
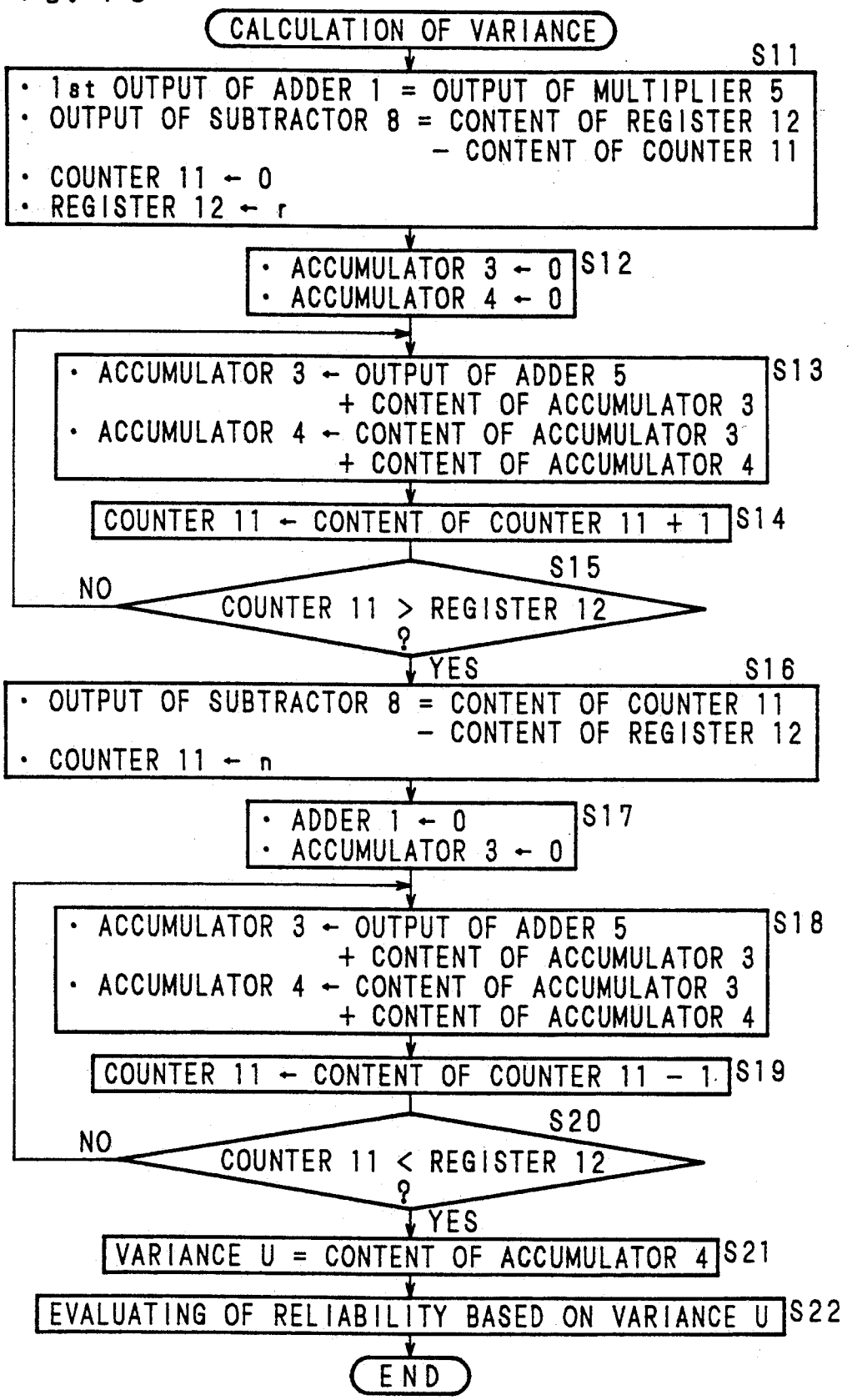
FIG. 10 is a flow chart to illustrate steps of calculating a variance by the method of the present invention.

The following steps are performed in the variance with reference to the flow chart of FIG. 10.

In obtaining the variance, the portion left of the center of gravity r of the function F, that is, the part where y varies from 0 to r, is calculated first.

In the calculation of the variance, counter 9 holds the value of j, accumulator 3 holds the value of $V_j$, and accumulator 4 holds the value of Uj. Subtractor 8 outputs the valu8e: "(r-j)", and the multiplier 5 outputs the value: $F_{(j)} \times (r-j)$.

Control circuit 14 controls data selector 6 so that the output of the multiplier 5 is supplied to the first input of the adder 1 as well as subtractor 8 which subtracts the contents of counter 11 from contents of the register 12. Control circuit 14 sets the contents of counter 11 to 0 and sets register 12 to the value of r (Step S11).

Using the same procedures as for calculating the center of gravity, control circuit 14 initializes accumulators 3 and 4 (Step S12), and then, controls adder 1 to add the contents of accumulator 3 to the output of the data selector 6, that is, the output of the multiplier 5, and controls adder 2 to add the contents of accumulator 3 to the contents of accumulator 4.

As a result, the adder 1 outputs the value:

$$V_j + F_{(j)} \times (r-j),$$

and the adder 2 outputs the value:

$$V_j + U_j, \text{ respectively.}$$

Control circuit 14 further controls accumulator 3 to fetch the output of the adder 1 and accumulator 4 to fetch the output of the adder 2. Accumulator 3 fetches the sum of the output of the multiplier 5 and the content of accumulator 3; accumulator 4 fetches the sum of the content of accumulator 3 and the content of accumulator 4 (Step S13). And then control circuit 14 adds 1 to the content of counter 11 (Step S14).

As in the case of the calculation of the center of gravity, until the content of the counter 11 becomes larger than the content of the register 12, that is, $j>r$, the fetching of data into the accumulators 3 and 4 and updating the counter 11 are repeated (Step S15). As a result, the variance $U_1$ of the left part of the function F is obtained in the accumulator 4.

Then, the variance $U_R$ of the part where y varies from r to n is obtained and is added to the variance $U_L$ of the left part.

The control circuit 14 controls subtractor 8 to subtract the contents of register 12 from the contents of counter 11, and sets the contents of counter 11 to n (Step S16).

Accordingly, the multiplier 5 outputs the value:

$$F_{(j)} \times (j-r)$$

after that.

At this time, the control circuit 14 controls the adder 1 to output the value 0 as well as initializing accumulator 3 to 0. After that, control circuit 14 allows the accumulator 3 to fetch the output (0 in this case) of the adder 1 (Step S17). However, control circuit 14 does not change the content of the accumulator 4.

Here, accumulator 3 holding the value of $W_j$ has been initialized, and then, in a similar manner to the processing of the Step S13 (Step S18), while the control circuit 14 is subtracting 1 from the center 11 (Step S19), it repeatedly fetches data into the accumulators 3 and 4 until the content of the counter 11 becomes less than the content of register 12, that is, $j<r$ (Step S20).

As a result, the variance $U_R$ of the right port is added to the accumulator 4, accordingly, the accumulator 4 holds the variance U of the whole function F (Step S21).

Finally, the control circuit 14 transfers this variance U to the general-purpose operator 13 and compares the value of the variance U itself or the value obtained by dividing the variance U by Q with a predetermined value, and stores this comparison result as reliability of the inference result in a register of the general-purpose operator 13 (Step S22), finishing the processing.

The fuzzy inference apparatus shown in FIG. 7 uses the multiplier 5 and the subtractor 8 to calculate the equations:

$$F_{(j)} \times (r-j),$$

$$F_{(j)} \times (j-r)$$

and obtains the variance (quadratic variance) defined with the following equation:

$$U = F_{(0)}X(0-1)^2 + F_{(1)}X(1-r)^2 + \ldots +$$

$$F_{(r-1)}X(r-r-1)^2 + F_{(r+1)}X(r+1-r)^2 + \ldots +$$

$$F_{(n+1)}X(n-r-1)^2 + F_{(n)}X(n-r)^2.$$

Figure 11:
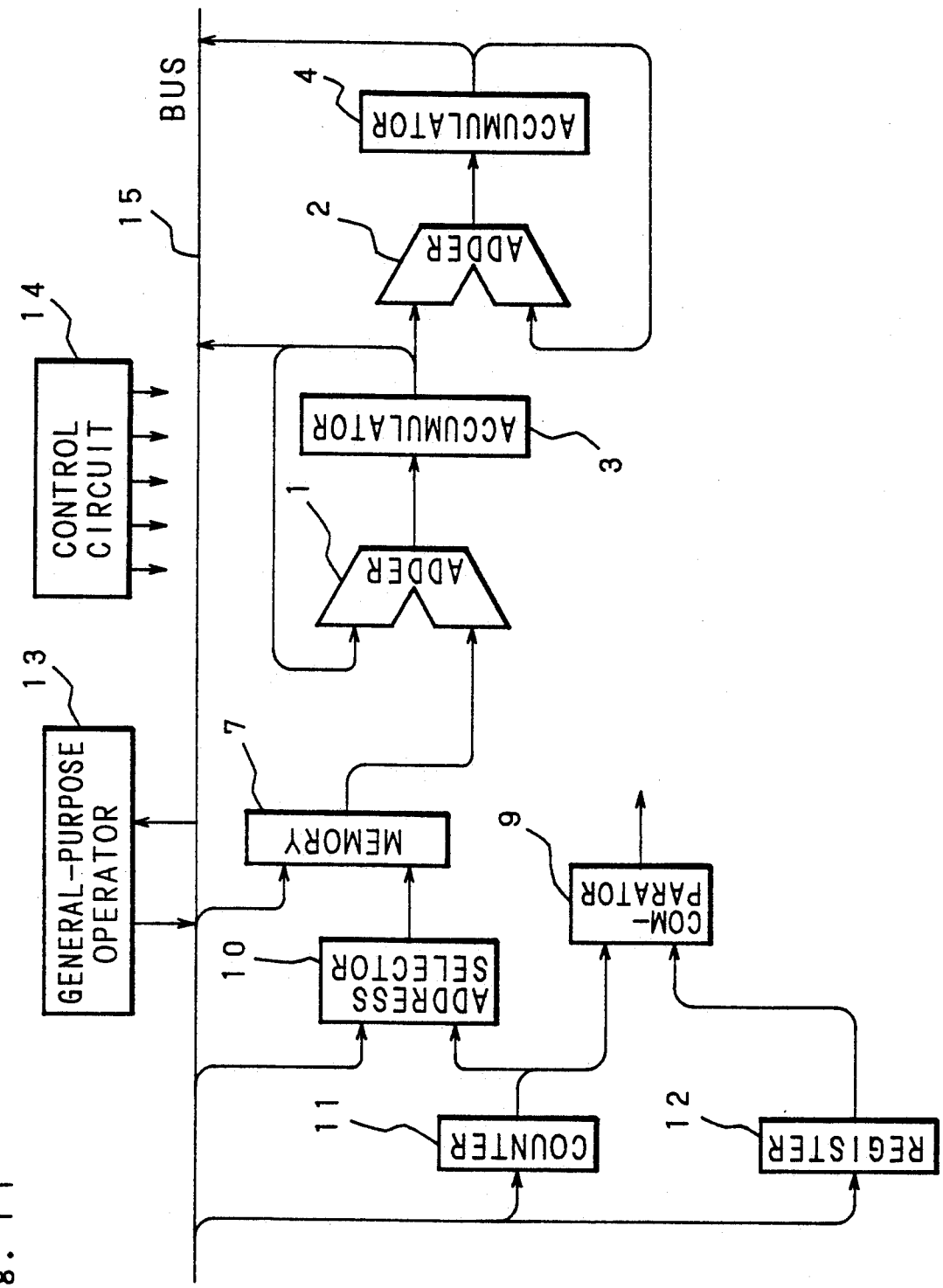
FIG. 11 is a block diagram to illustrate another example of construction of the fuzzy inference apparatus to execute the fuzzy inference method in accordance with the present invention.

However, multiplier 5, subtractor 8, and data selector 6 may be omitted from the apparatus shown in FIG. 7. In this case, when calculating the variance, adder 1 adds the output of the memory 7, that is, $F_{(j)}$, as shown in FIG. 11. The variance (primary variance) defined with the following equation is obtained:

$$U = F_{(0)}X|0-1| + F_{(1)}X|1-r| + \ldots +$$

$$F_{(r-1)}X|r-r-1| + F_{(r+1)}X|r+1-r| + \ldots +$$

$$F_{(n-1)}X|n-r-1| + F_{(n)}X|n-r|.$$

In the above preferred embodiment, the reliability as computed is stored in the register of the general-purpose operator 13. However, the reliability is not more than a predetermined value, it is possible that an alarm signal is supplied.

Figure 1:
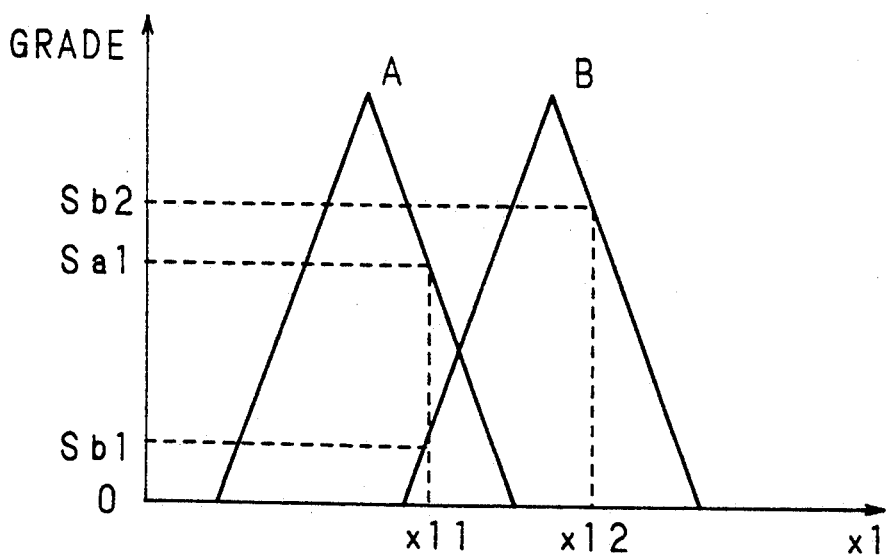
FIG. 1 is a schematic view to explain a membership function.
Figure 2:
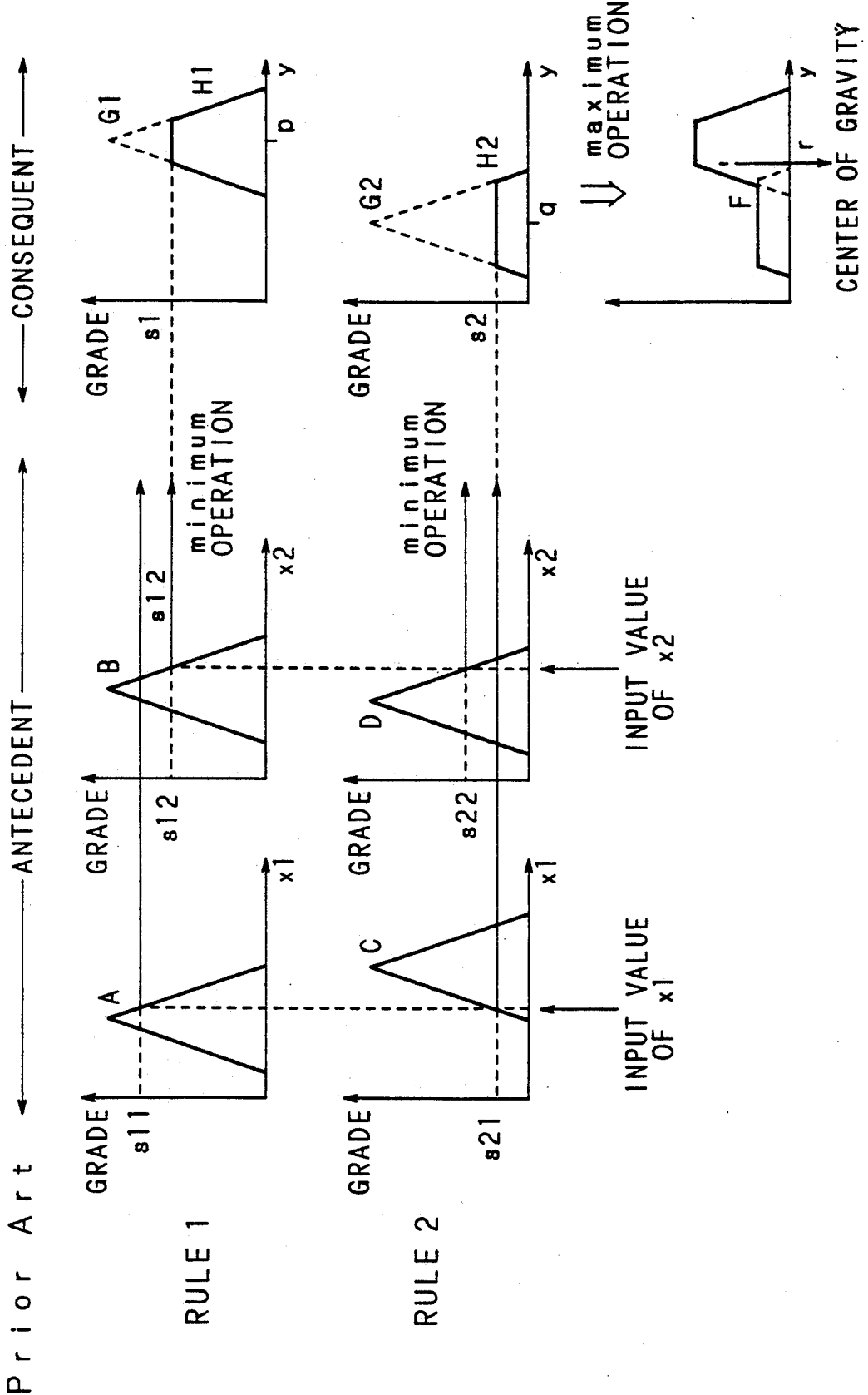
FIG. 2 is a schematic view to explain the general conventional method or making a fuzzy inference.
Figure 3A:
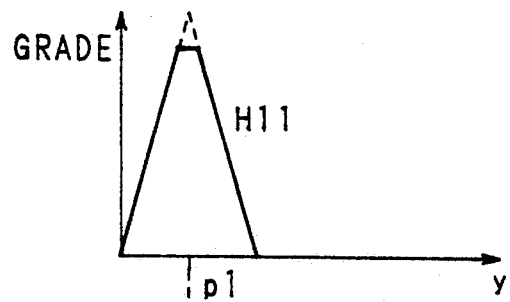
FIGS. 3a and 3b are a schematic view to explain inconsistency generated in a fuzzy rule.
Figure 3A:
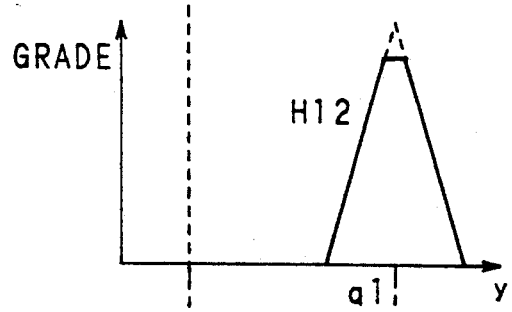
Figure 3B:
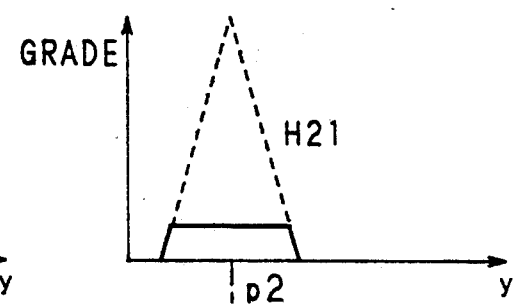
Figure 3B:
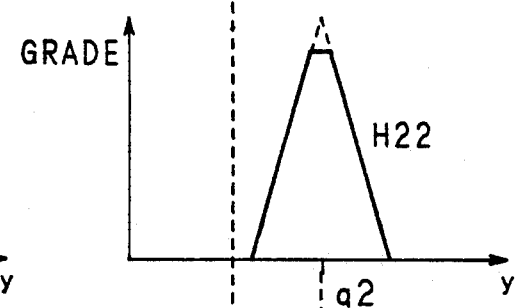
Figure 3B:
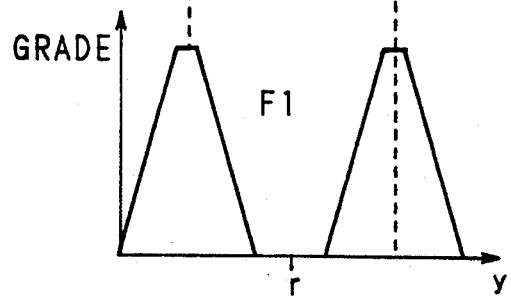
Figure 3B:
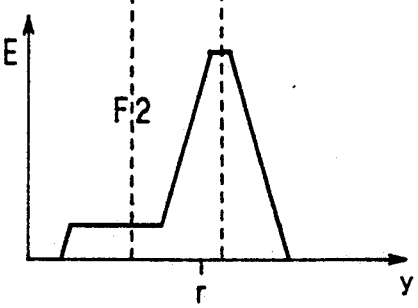
Figure 4:
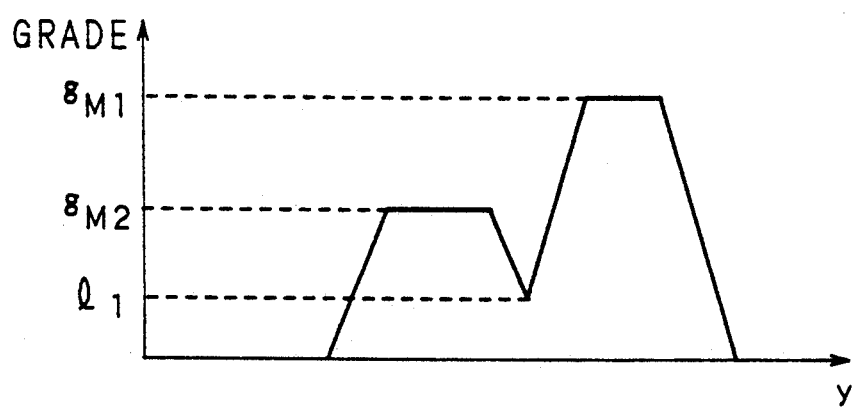
FIG. 4 is a schematic view to explain a method of detecting inconsistency generated in the fuzzy rule.
Figure 5A:
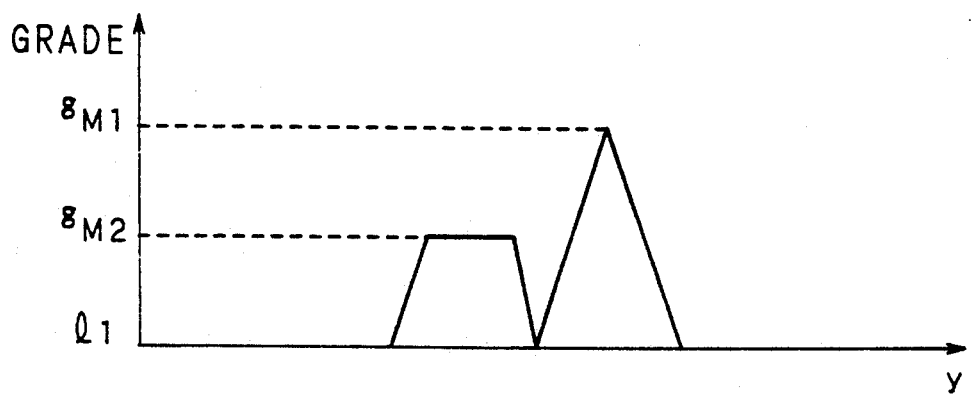
FIGS. 5a and 5b are a schematic view to explain a problem in such a method of detecting inconsistency generated in the fuzzy rule as shown in FIG. 4.
Figure 5B:
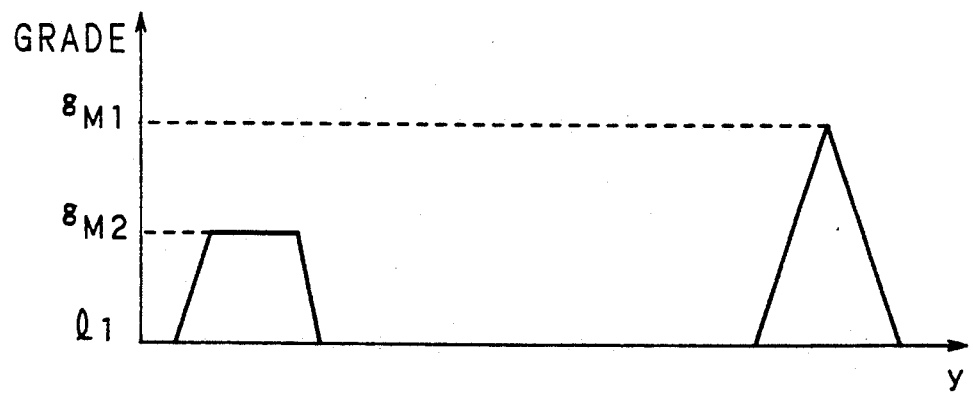

As described above in detail, according to the fuzzy inference method of the present invention, the variance for the finally obtained membership function is obtained, and according to the value of this variance, inconsistency in the rule is evaluated to be an index to evaluate the reliability of the inference. The value of the horizontal axis of the membership function is added to the obtained variance, and the variance shown in FIG. 5(a) becomes a smaller value and the variance shown in FIG. 5(b) becomes a larger value, for example. As a result, it becomes possible to determine that there is small inconsistency in the rule in the case shown in FIG. 5(a) and there is large inconsistency in the case shown in FIG. 5(b). Therefore, according to the fuzzy inference method of the present invention, it is possible to evaluate reliability of the inference more precisely than using conventional methods and apparatuses.

As this invention may be embodied in several forms without departing from the spirit of essential characteristics thereof, the present embodiment is therefore illustrative and not restrictive, since the scope of the invention is defined by the appended claims rather than by the description preceding them, and all changes that fall within meets and bounds of the claims, or equivalence of such meets and bounds thereof are therefore intended to be embraced by the claims.

What is claimed is:

1. Apparatus for performing fuzzy inference, comprising:
    means for processing an antecedent to obtain a plurality of first membership functions forming a consequent in accordance with a plurality of fuzzy rules;

means for processing said consequent to obtain a second membership function by selecting a greater one of each of said plurality of first membership functions obtained by the processing of said antecedent;

means for supplying an output in accordance with said second membership function;

means for obtaining a variance in accordance with the second membership function; and means for evaluating a reliability of said output in accordance with said variance.

2. The apparatus for performing fuzzy inference of claim 1 wherein said means for obtaining a variance comprises means for calculating a quadratic variance.

3. The apparatus for performing fuzzy inference of claim 1 wherein said means for obtaining a variance comprises means for selectively adding and subtracting product terms including means for (i) multiplying a series of consequent values by respective corresponding values of said second membership function to supply said product terms, and (ii) selectively adding and subtracting said product terms to supply said sum of products.

4. An apparatus for performing fuzzy inference, comprising:

means for processing a value of an antecedent to obtain a plurality of first membership functions forming a consequent in accordance with a plurality of fuzzy rules;

combining means for processing said consequent to obtain a second membership function by selecting a greater one of each of said plurality of first membership functions obtained by the processing of said antecedent;

means for supplying an output in accordance with said second membership function;

means for obtaining a variance in accordance with the second membership functions; and validity checking means for evaluating a reliability of output in accordance with said variance, wherein said means for processing a value of an antecedent to obtain a plurality of first membership functions includes a memory for storing said plurality of first membership functions.

* * * * *